United States Patent
Mozer

(10) Patent No.: US 9,732,431 B2
(45) Date of Patent: Aug. 15, 2017

(54) CATHODE-DRIVEN OR ASSISTED SOLAR CELL

(75) Inventor: Attila J. Mozer, Wollongong (AU)

(73) Assignee: AQUAHYDREX PTY LTD, New South Wales (AU)

( * ) Notice: Subject to any disclaimer, the term of this patent is extended or adjusted under 35 U.S.C. 154(b) by 0 days.

(21) Appl. No.: 14/008,476

(22) PCT Filed: Mar. 28, 2012

(86) PCT No.: PCT/AU2012/000324
§ 371 (c)(1),
(2), (4) Date: May 7, 2014

(87) PCT Pub. No.: WO2012/129606
PCT Pub. Date: Oct. 4, 2012

(65) Prior Publication Data
US 2014/0231246 A1 Aug. 21, 2014

(30) Foreign Application Priority Data
Mar. 28, 2011 (AU) ................. 2011901134

(51) Int. Cl.
| | |
|---|---|
| *C25B 1/04* | (2006.01) |
| *C25B 11/04* | (2006.01) |
| *C25B 1/00* | (2006.01) |
| *H01G 9/20* | (2006.01) |
| *H01M 14/00* | (2006.01) |

(52) U.S. Cl.
CPC ............. *C25B 1/04* (2013.01); *C25B 1/003* (2013.01); *C25B 11/0447* (2013.01);
(Continued)

(58) Field of Classification Search
CPC .... C25B 1/003; C25B 1/02–1/12; C25B 1/04; C25B 11/0447; H01G 9/2004;
(Continued)

(56) References Cited

U.S. PATENT DOCUMENTS

| | | | | |
|---|---|---|---|---|
| 4,289,591 A | * | 9/1981 | Davidson et al. | 205/634 |
| 8,388,818 B1 | * | 3/2013 | Menezes | 204/248 |

(Continued)

FOREIGN PATENT DOCUMENTS

WO 03/079480 A1 9/2003

OTHER PUBLICATIONS

He, et al., "Dye-Sensitized Nanostructured p-Type Nickle Oxide Film as a Photocathode for a Solar Cell" J. Phys. Chem. B, vol. 103, No. 42, American Chemical Society, 1999 pp. 8940-8943.

Nattestad, et al., "Dye-sensitized nickel(II)oxide photocathodes for tandem solar cell applications" IOP Publishing, Ltd Nanotechnology 19 (2008), pp. 295-304 (9pp).

(Continued)

*Primary Examiner* — Ciel Thomas
(74) *Attorney, Agent, or Firm* — Bryan D. Zerhusen; Locke Lord LLP

(57) ABSTRACT

In one form, a photoelectrochemical cell comprising a p-type sensitized photocathode including a sensitizer dye and a water-based electrolyte. In another form, the sensitizer dye and an adjacent semiconductor may have a reduction potential that is sufficiently high to either reduce a desired chemical feedstock in the cell or reduce protons in the water to hydrogen gas. The semiconductor to which the sensitizer dye is affixed may be nickel oxide. The photoelectrochemical cell can include a sensitized photocathode and an electrolyte that contains an electron acceptor, where light illumination of the sensitized photocathode results in reduction of the electron acceptor. The electrolyte can include water.

16 Claims, 10 Drawing Sheets

(52) U.S. Cl.
CPC ......... *H01G 9/2004* (2013.01); *H01G 9/2027* (2013.01); *H01G 9/2059* (2013.01); *H01M 14/005* (2013.01); *Y02E 10/542* (2013.01); *Y02E 60/368* (2013.01); *Y02E 70/10* (2013.01); *Y02P 20/135* (2015.11)

(58) Field of Classification Search
CPC . H01G 9/2027; H01G 9/2059; H01M 14/005; Y02E 10/542; Y02E 60/368; Y02E 70/10; Y02P 20/135
See application file for complete search history.

(56) References Cited

U.S. PATENT DOCUMENTS

| | | | |
|---|---|---|---|
| 2005/0194041 A1 | 9/2005 | Fan et al. | |
| 2010/0133111 A1* | 6/2010 | Nocera ................... | C25B 1/003 |
| | | | 205/633 |
| 2010/0143811 A1* | 6/2010 | Brimblecombe et al. .... | 429/422 |
| 2012/0216865 A1* | 8/2012 | Snaith ........................... | 136/263 |

OTHER PUBLICATIONS

Hao, et al., "Modification of photocathode of dye-sentitized nanocrystalline solar cell with platinum by vacuum coating, thermal decomposition and electroplating", Composite Interfaces, vol. 13, No. 8-9, pp. 899-909 (2006).
International Search Report and Written Opinion dated Mar. 28, 2012.

\* cited by examiner (a)

(b)

CATHODE-DRIVEN OR ASSISTED SOLAR CELL

RELATED APPLICATIONS

This application is a 35 U.S.C. §371 U.S. national entry of International Application PCT/AU2012/000324 (WO 2012/129606) having an International filing date of Mar. 28, 2012, which claims the benefit of Australian Application 2011901134, filed Mar. 28, 2011, the teachings of which are incorporated herein by reference.

TECHNICAL FIELD

The present invention generally relates to a solar cell or a photoelectrochemical cell, more specifically including an electrolyte that is capable of facilitating chemical reactions, including the splitting of water into hydrogen and oxygen, when driven or assisted by the interaction of light with a cathode.

BACKGROUND

Solar-driven splitting of water ($H_2O$) into hydrogen ($H_2$) and oxygen ($O_2$) using photoactive catalysts is one of the "Holy Grails" of science (see the article entitled: "*Artificial Photosynthesis: Solar Splitting of Water into Hydrogen and Oxygen*" by Allen J. Bard and Marye Anne Fox, in the journal "Accounts of Chemical Research (1995), Vol 28, pages 141-145). Efficient and sustained water-splitting using nothing but sunlight has the potential to solve two of mankind's most pressing problems, namely:

(i) Large-scale electricity and/or fuel generation.
  Hydrogen is a fuel that could, in future, displace gasoline and diesel in transportation and other applications. Hydrogen and oxygen are, for example, already used as a rocket fuel. Hydrogen and oxygen can be readily recombined in a fuel cell to generate electricity. Several tens of terawatts of solar energy arrive at the Earth's surface each year. If efficient means were available to collect and convert even a tiny fraction of this energy into hydrogen and oxygen, it could supply the entire energy needs of the current and predicted future population of the planet.
(ii) Climate change due to greenhouse gas effects.
  Water-splitting generates the gases hydrogen and oxygen that do not have known greenhouse effects. No carbon emission is involved.

Despite several decades of intensive work in the area, a photocatalytic system that effectively splits water using only sunlight is still absent. The main reason is that water is one of the most stable compounds on Earth.

The process of splitting water is known as "electrolysis". It involves two half-reactions that must occur at the two electrodes in an electrochemical cell with water as the electrolyte. The water is split into oxygen, $O_2$, at one electrode ("water oxidation") and hydrogen, $H_2$, at the other ("proton reduction"), according to equations (1) and (2).

  (1)

  (2)

Water-splitting is an endothermic reaction and requires the provision of energy to proceed spontaneously. This energy can be provided from an external electrical power source or it could be created by some other means. Because an external electrical voltage must be applied to drive the reaction, electrolysis is unviable as a means of cheaply generating hydrogen. If, however, the voltage could be created by some other means, such as by illumination with sunlight, then $H_2$ could be potentially generated cheaply. The key problem is the water oxidation step (equation (1)), which has a higher activation energy than hydrogen generation (equation (2)). Only one truly efficient photocatalyst of water-oxidation is known—the biological Water-Oxidizing Complex (WOC) in Photosystem II (PSII) that is found in all photosynthetic organisms.

As can be seen in equation (2), the step of oxidizing water, $H_2O$, requires:
  the removal of 4 electrons from two water molecules,
  the breaking of 4 chemical bonds, between hydrogen and oxygen atoms (two H—O bonds in each water molecule), and
  the formation of 1 new bond between two oxygen atoms (to give $O_2$).

This step can only be viable if it is facilitated by powerful catalysts that greatly decrease the activation energy involved in water oxidation. Catalysts are species that mediate chemical reactions without themselves becoming changed. Precious metal catalysts, like platinum (Pt), are typically used in commercial water electrolyzers to oxidize water and/or reduce protons by the application of an external voltage bias (usually >2 V). Whilst such catalysts are not light-driven, they are, at least, relatively energetically efficient in facilitating the water-splitting half-reactions.

For the step of water oxidation to be driven by light, one needs a photosystem in which photoinduced charge separation is followed by an efficient electron cascading step that results in the oxidation of water. Catalysts that facilitate the latter reaction when illuminated by light are critical. Several potential catalysts of this type exist, however the conditions involved in oxidising water are so demanding that most light-driven catalysts decompose over time, leading to photo-degradation and the eventual termination of the water-splitting reaction.

The proton reduction step (equation (2)) is, by contrast less energy intensive. It requires only:
  the addition of 2 electrons to two protons ($H^+$),
  the forming of 1 new bond between two hydrogen atoms to yield $H_2$ "Solar-driven" water-splitting, in which the only components required are sunlight, a photocatalyst and water, is distinguished from "solar-assisted" water-splitting where in addition to illumination by light, one also applies a moderate voltage bias using an external power source or electricity grid. Alternatively, a chemical bias may be applied in addition to the light illumination, by employing sacrificial additives to oxidize or reduce the intermediates in the catalysis. The additives may also be used to increase or decrease the pH.

Many solar-assisted water-splitting systems may be considered to be "half-cells", since only either the water oxidation or proton reduction side is efficient, but not both. The electrical or chemical bias is used to facilitate the inefficient reaction to at least the same level as a comparable solar-driven reaction so it does not limit the overall performance of the water-splitting cell.

A common approach in water-splitting research is to employ a so-called photoelectrochemical cell (PEC). Such cells comprise two electrodes—an anode and a cathode—separated by water electrolyte. The anode facilitates the water oxidation step (equation (1)) and is typically light-responsive. This electrode usually absorbs photons of light to induce charge separation. The resulting electrons travel through an external circuit to the cathode. As a result, so-called "holes" are left within the photoanode material itself. These holes, which have sufficient electrochemical potential to oxidise water, migrate to the surface of the photoanode and convert water into oxygen. The photogenerated electrons travel via an external circuit to the cathode where they reduce protons, generating hydrogen.

In such a system, the photoanode is the "motor" that drives the overall reaction. There are a number of potential photoanode materials available, including semiconductors like $TiO_2$, $Fe_2O_3$, $WO_3$, and CdSe. However, all such materials suffer from serious technical problems that limit their practical utility, including:

(i) they are insufficiently photo-stable under prolonged illumination and are therefore unsuitable for long-term operation;
(ii) their visible light response is limited to wavelength regions that comprise only small proportions of the solar spectrum. They, therefore, are inefficient at harvesting the energy of the illuminating light;
(iii) they can sometimes only be used for half cells. That is, their driving force under illumination by sunlight is insufficient to facilitate overall water-splitting at both electrodes.

To overcome or ameliorate the issue of photo-stability and visible light-response, large band gap inorganic oxide semiconductors like $TiO_2$, ZnO, $SnO_2$, $Nb_2O_5$, may be "sensitized". To improve the efficiency with which they harvest the energy from sunlight, a dye is attached to the semiconductor anode. The dye absorbs a larger proportion of the light than the underlying semiconductor. Upon absorption of a photon of light, the dye injects an electron into the semiconductor. The oxidised dye is regenerated when it oxidises water according to equation (1). The injected electrons move through the external circuit to reduce protons at the cathode according to equation (2). This process is referred to as "n-type dye-sensitisation".

Sensitization is a technique that comes out of the field of "Dye-Sensitised Solar Cells" (DSSC's) (also referred to as: dye-sensitized photovoltaic cells). DSSCs generate an electrical voltage when illuminated with sunlight. Sensitizers are used to expand the wavelength regions of the solar spectrum that are absorbed by the solar cell.

There are very significant problems with using n-type dye-sensitisation for solar-driven water-splitting or for solar-driven reactions that employ a water-based electrolyte. The major problem is that water interferes with many of the reactions that are employed in conventional dye-sensitized solar cells. Additionally, the following key issues present themselves in the specific case of water-splitting:

(i) The oxidation potential of the dye needs to be larger than the oxidation potential of water, typically +0.817 V to +1.23 V (at pH 7 and 0, respectively). In the absence of strong catalytic activity of the dye itself, a large (0.5 V to 1 V) overpotential is required to effectively drive this reaction. The number of dyes that have such a high oxidation potential and are able to perform all the other functions, such as visible light absorption and charge injection, is vanishingly small.
(ii) Using a co-catalyst may reduce the overpotential for water oxidation, however it introduces another problem—that of interfacing the light harvesting unit with the co-catalyst. While the water oxidation overpotential may, thus, be diminished, a new electron transfer step is introduced between the light harvesting dye and the co-catalyst, which requires a driving force to proceed spontaneously and efficiently. This is lowering the maximum achievable efficiency of this process.
(iii) Under such strongly oxidising conditions, the dye or the dye/semiconductor interface is typically unstable. Most dyes absorbing in the visible spectral range contain unsaturated double bonds, which are prone to oxidation under strongly oxidising conditions, leading to instability.
(iv) The water oxidation reaction generates protons that may catalyse the desorption of the acid-linker groups used in most typical dye sensitiser linkers. Dyes that do not desorb rapidly from the semiconductor surface are yet to be developed.

At present, three dye-sensitised photoelectrochemical systems have been reported that can oxidise water using a co-catalyst. All employ n-type sensitization. These devices display 1-2% photon-to-electron conversion efficiencies, and feature very short device lifetimes, in the realm of minutes. All operate under "half-cell" conditions where the hydrogen is generated at a platinum (Pt) counter electrode by applying a moderate, additional voltage bias.

Consequently, a clear need exists to develop improved solar water-splitting devices which address or at least ameliorate one or more problems inherent in the prior art.

A clear need also exists to develop solar cells capable of undertaking chemical transformations in water-based solvent systems. There is a general move to "green" chemistry, which avoids the need for organic solvents in chemical reactions. This is also true for solar-driven chemical transformations.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

The present invention addresses the need for improved solar electrochemical cells employing water as electrolyte, especially for solar water-splitting. The Applicant has surprisingly found that the use of water as an electrolyte in p-type sensitized solar cells generally yields remarkably stable, highly active photoelectrochemical cells. This effect appears to derive from strong stabilization afforded by the water to photoactivated, charge-separated p-type dye species. This technology demonstrates a new paradigm for photoelectrochemical transformations, particularly water-splitting, using dye-sensitised electrodes. Instead of, or possibly in conjunction with, using photoanodes to oxidize water as described above, it has now been found that dye sensitised photocathodes can generate hydrogen highly efficiently. A sensitizer dye(s) can be attached to or provided as part of a cathode, referred to as p-type dye-sensitization, to provide a p-type sensitized photocathode. Absorption of a photon of light by the dye is accompanied by hole injection into the semiconductor of the cathode. Electrons are thereby drawn around the external circuit to the cathode by the injected holes.

According to one aspect of the present invention there is provided a photoelectrochemical cell comprising: a p-type sensitized photocathode including a sensitizer dye; and an electrolyte. Preferably, but not exclusively, the electrolyte is water or is water-based.

Preferably, but not exclusively, the sensitizer dye and an adjacent semiconductor may have a reduction potential that is sufficiently high to either: reduce a desired chemical feedstock in the cell, or reduce protons in the water to hydrogen gas.

Preferably, but not exclusively, the semiconductor to which the sensitizer dye is attached to, affixed or provided as part of, is at least partially nickel oxide (NiO).

Preferably, but not exclusively, the semiconductor to which the sensitizer dye is attached to, affixed or provided as part of, has the potential of a conduction band tuned so as to be sufficiently high to either: reduce a desired chemical feedstock in the cell, or reduce protons in the water to hydrogen gas.

Preferably, but not exclusively, the potential of the conduction band is tuned by co-incorporation within the semiconductor of other semiconductors phases, such as $WO_3$, and/or $Fe_2O_3$. Preferably, but not exclusively, the sensitizer dye is capable of catalytically facilitating the desired chemical transformation.

Preferably, but not exclusively, the sensitizer dye can absorb, at least to some extent, in the infra-red portion of the solar spectrum to thereby maximise, or at least increase, the range of solar frequencies that can be harvested. This is especially true in photoelectrochemical cells in which a p-type sensitized cathode is combined with a complementary photoanode that absorbs in the visible and infra-red portions of the solar spectrum.

Preferably, but not exclusively, the sensitizer dye is stable to reduction by the product of the chemical transformation which is being undertaken in the solar cell. For example, in one form the sensitizer dye is stable to reduction by hydrogen in a water-splitting solar cell. Preferably, but not exclusively, the sensitizer dye is stable to dye desorption in water.

Preferably, but not exclusively, an example photoelectrochemical cell can absorb a larger overall portion of the solar spectrum than is possible using equivalent n-type sensitized dye-sensitized solar cells. This is a particularly significant given that infra-red light comprises approximately two thirds of the solar spectrum.

Preferably, but not exclusively, the sensitizer dye(s) can be one or more of the following types of dye: perylene, naphthalene, anthracene, porphyryns, indolines, coumarins, donor-acceptor type organic dyes, and combinations thereof.

Preferably, but not exclusively, the semiconductor to which the sensitizer dye is attached to, affixed or provided as part of, can be one or more of the following types of semiconductor: NiO, p-CdSe, p-CdTe, p-InP, GaAs, $CuInSe_2$, $Fe_2O_3$, SiC, ZnSe, and combinations thereof.

According to another aspect, there is provided a photoelectrochemical cell comprising a water-based electrolyte that includes:
  a p-type sensitized photocathode with a conventional anode in a solar-driven or solar-assisted process; or
  a p-type sensitized photocathode with a catalytic anode in a solar-driven or solar-assisted process; or
  a p-type sensitized photocathode with a photoanode in a solar-driven or solar-assisted "tandem cell" arrangement; or
  a p-type sensitized photocathode with an n-type sensitized photoanode in a solar-driven or solar-assisted "tandem cell" arrangement.

Preferably, but not exclusively, the photoanode in a tandem cell can be at least partially one or more of the following: $TiO_2$, ZnO, $Fe_2O_3$, $WO_3$, CdS, CdSe, $Nb_2O_3$, $SnO_2$, and combinations thereof.

Preferably, but not exclusively, the n-type sensitizer dye(s) which is attached to, affixed or provided as part of the photoanode semiconductor in a tandem cell can be one or more of the following: Ru(bipy) (bipy=2,2'-bipyridine), perylene, naphthalene, anthracene, porphyryns, indolines, coumarins, donor-acceptor type organic dyes, and combinations thereof.

According to another aspect, there is provided a solar-driven or solar-assisted device including a water-based electrolyte that employs a p-type sensitized reduction process and a chemically-driven or sacrificial oxidation process, where the resulting "chemical bias" is used to drive the inefficient oxidation half-reaction to at least the same level as the solar-driven or solar-assisted reduction reaction.

In respect of water-splitting, example advantages of various embodiments include, but are not limited to:
  (i) Most commercially available or naturally occurring dyes possess reduction potentials that are sufficiently high to reduce protons in water to hydrogen gas. There is therefore a wide choice of sensitizing dyes that can be used and includes dyes that absorb in the infra-red portion of the solar spectrum. Infra-red absorbing dyes are unknown in p-type sensitized electrodes in solar cells.
  (ii) A large range of very efficient, hydrogen generating co-catalysts are available. By contrast, only a few water oxidizing co-catalysts are known. Thus, the use of p-type sensitization imparts water-splitting cells of this type with potentially high efficiency. Alternatively or additionally, because equation (2) is significantly less difficult to catalyse than equation (1), it is easier to find p-type sensitizer dyes that employ a catalytic action capable of facilitating equation (2) than it is to find n-type sensitizer dyes capable of catalyzing equation (1). Indeed, n-type sensitizer dyes able to catalyze equation (1) are, essentially, unknown.
  (iii) Typical p-type sensitising dyes are more stable to reduction by hydrogen than n-type sensitizer dyes are to oxidation by oxygen and/or its reactive intermediates during water oxidation. For this reason, photoelectrochemical cells employing p-type sensitized photocathodes are likely to have longer lifetimes and be more durable.
  (iv) Dye desorption in water is substantially less problematic for p-type sensitized photocathodes than for n-type sensitized photoanodes.
  (v) It is possible to fabricate so-called tandem cells in which a p-type sensitized cathode is combined with a complementary photoanode. For example, a photocathode employing an infra-red absorbing p-type sensitizing dye may be combined with a photoanode that absorbs visible and ultra-violet light, but which is transparent to infra-red light. A photoelectrochemical cell of this type may then absorb a larger overall portion of the solar spectrum than is possible using current n-type sensitized dye-sensitized solar cells. This is a particularly significant advantage given that infra-red light comprises approximately two thirds of the solar spectrum.

In respect of other chemical transformations, example advantages of various embodiments include, but are not limited to:
  (i) A cell containing a p-type sensitized photocathode may facilitate light-driven or light-assisted chemical transformations using water as a solvent or a water-containing solvent. This is generally not possible in cells employing n-type sensitizing photoanodes. Thus, chemical reactions that can only be carried out in water can now be facilitated in a solar photoelectrochemical cell.

(ii) The use of water as solvent eliminates the need for volatile organic solvents. This is environmentally preferable and also drastically improves upon the stability of the solar cell in many cases because organic solvents, being volatile, tend to evaporate more quickly when left for long periods in the sun. Organic solvents are also often more corrosive toward seals and coverings in solar cells.

BRIEF DESCRIPTION OF FIGURES

Embodiments of the present invention will now be described solely by way of non-limiting example and with reference to the accompanying drawings in which.

PREFERRED EMBODIMENTS

The following modes, given by way of example only, are described in order to provide a more precise understanding of the subject matter of a preferred embodiment or embodiments.

Example 1

Figure 1:
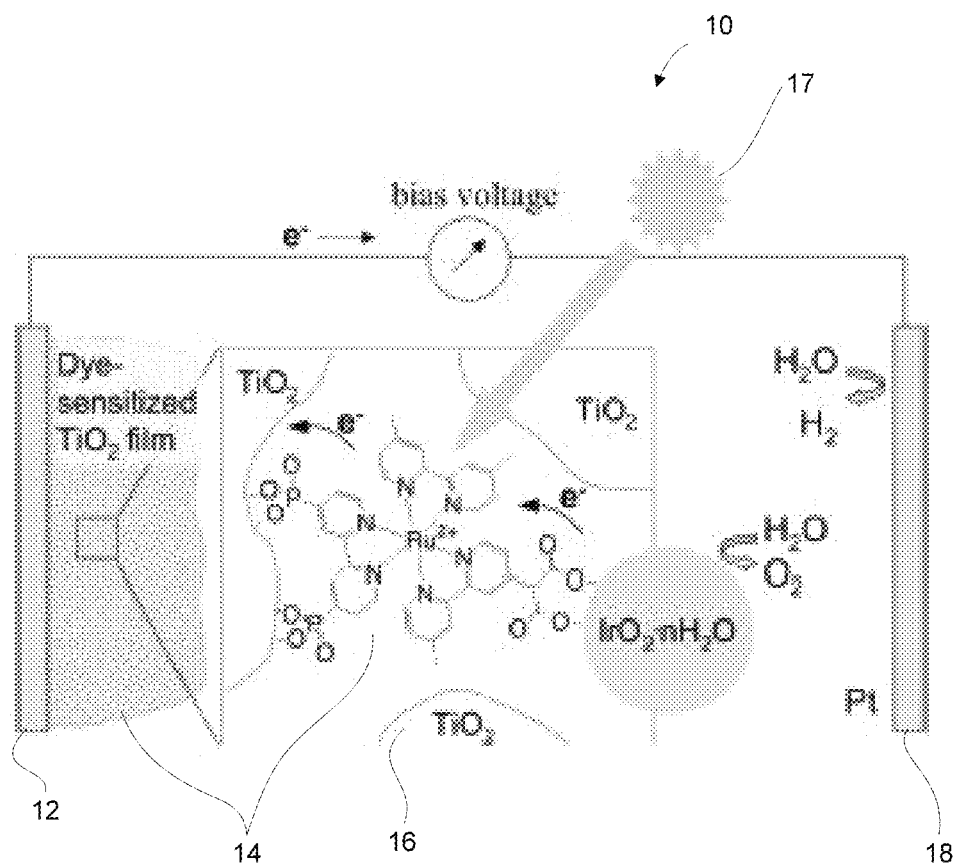
FIG. 1 depicts a schematic showing the operation of a known solar-assisted water-splitting dye-sensitized solar cell.

A Water-Splitting P-Type Sensitized Photocathode with a Conventional or Catalytic Anode in a Solar-Driven or Solar-Assisted Process The working principle of a known dye-sensitized solar cell 10 that splits water is shown in FIG. 1 (prior art). As can be seen, the anode 12 of the solar cell 10 includes an n-type Ruthenium sensitizer dye 14 which is attached to $TiO_2$ film 16, and also interfaces with an $IrO_2$ catalyst. Sunlight 17 is incident on anode 12. The cathode 18 is a simple platinum electrode.

Figure 2:
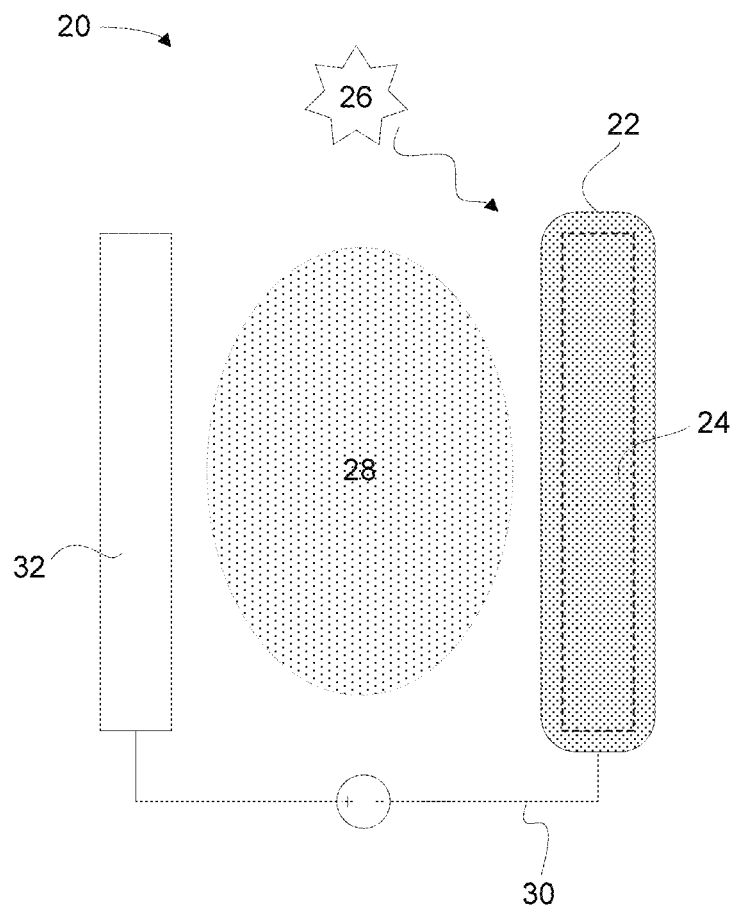
FIG. 2 shows a schematic of an example water-splitting photoelectrochemical cell including a sensitized photocathode.

In a general form, and referring to FIG. 2, the principle of the current invention is the reverse of this arrangement. FIG. 2 shows a photoelectrochemical cell 20 including a sensitized photocathode 24, 22. A sensitizer dye 22, such as a perylene or a related dye, is attached to, affixed or provided as part of cathode material 24 to form the photocathode 24, 22. The cathode material 24 is preferably, though not necessarily, a semiconductor. Sunlight 26 is absorbed by the sensitizer dye 22, which is typically, but not necessarily, chemically attached to a nano-structured electrode 24, for example NiO. Upon illumination with light 26, electrons are transferred from the NiO valance band to the Highest-Occupied Molecular Orbital (HOMO) of the photo-excited dye (or the low-energy SOMO in the excited state), creating a negatively charged, reduced dye. A hole is then left in the valance band of the NiO. The reduction potential of the electron on the reduced dye is around −1.3 V, which is much higher than the standard redox potential of proton reduction to hydrogen. The conversion of protons to hydrogen therefore proceeds efficiently in clean water 28 without the use of any additional catalyst.

The holes in the NiO are collected on a transparent electrode (for example fluorine-doped $TiO_2$ at no additional applied potential). Electrons are induced to move from the anode 32 to the photocathode 24, 22 through the external circuit 30 to quench the holes. As a result, electrons are abstracted from molecules of water 28 at the counter electrode (anode) 32, for example made of platinum, generating oxygen gas. Due to the overpotential for water oxidation at platinum, an additional, moderate external voltage (ca. 0.2 V) needs to be supplied in this specific arrangement of materials. That is, when NiO is used as a semiconductor electrode 24 with a perylene-based p-type sensitizing dye 22, using pH 7 water 28 as electrolyte, and with Pt as the counter electrode (anode) 32, then the cell 20 is solar-assisted, not solar-driven. The cell 20 can be housed, positioned or encapsulated in a range of different housings, frameworks or bodies to contain the electrolyte and/or protect the anode and photocathode. It may also be desirable that the cell is structured to allow the electrolyte to flow past the anode and/or photocathode so that the electrolyte can be refreshed.

In one example, the sensitizer is a p-type dye (e.g. donor-acceptor dye) and may be a triaryl-oligothiophene-perylene dye. In another example, the sensitizer is a semiconductor nanoparticle (quantum dot), such as but not limited to $WO_3$, or $Fe_2O_3$. An additional small voltage is needed to drive the cycle for these materials. The system can be made solar-driven by, amongst others: (i) using a sensitizing dye with a larger reduction potential, or (ii) modifying the conduction band of the NiO to incorporate within its lattice another semiconductor phase, such as $Fe_2O_3$ or $WO_3$.

Thus, in a broad form there is provided a photoelectrochemical cell that comprises a p-type sensitized photocathode which includes a sensitizer, and where the cell includes an electrolyte. The photocathode can be formed of, or at least partially formed of, a range of different materials or a composite of materials. The sensitizer can be a range of materials or chemical compounds that facilitate hole donation to the cathode material or part thereof.

The electrolyte can include an electron acceptor, which again can be a range of different chemicals or molecules that provide the function of electron acceptance. Light illumination of the p-type sensitized photocathode results in reduction of the electron acceptor.

Thus, in another general form, there is provided a photoelectrochemical cell comprising a sensitized photocathode and an electrolyte that contains an electron acceptor. Light illumination of the sensitized photocathode results in reduction of the electron acceptor and consequently generation of a fuel. If the sensitized photocathode includes a p-type sensitizer and the electrolyte is water-based, then the generated fuel would be hydrogen. However, a range of other fuels could be generated if different electrolytes or electron acceptors were utilised.

Most preferably, the electrolyte is water or is water-based. Other chemicals, compounds, materials, catalysts, etc. can be provided in the electrolyte if desired. Illumination of the p-type sensitized photocathode with light, which need not be visible light but can be from a non-visible part of the electromagnetic spectrum, results in reduction of water and formation of hydrogen.

Preferably, the sensitizer is a dye, an organic dye and/or a donor-acceptor dye. A mixture of different sensitizers or dyes can be utilised. For example this could allow the photocathode to be photoactive over a broader range of frequency spectrum by utilising a mixture of different dyes or other types of sensitizers. For example, the sensitizer could be a metal complex, a semiconductor nanoparticle or a quantum dot.

The sensitizer dye(s) can be one or more of the following types or bases of dye: perylene, naphthalene, anthracene, porphyryns, indolines, coumarins, donor-acceptor type organic dyes, and combinations thereof. The photocathode can be at least partially formed of a semiconductor to which the sensitizer is attached to, affixed or provided as part of, and can be one or more of the following types of semiconductor: NiO, p-CdSe, p-CdTe, p-InP, GaAs, CuInSe$_2$, Fe$_2$O$_3$, SiC, ZnSe, and combinations thereof.

In one form the second electrode (i.e. anode) is not photoactive. In use, a redox reaction proceeding at the second electrode is oxidation of water to oxygen. The second electrode could be provided with a type of catalyst to promote oxidation of water. Although there are a variety of potential catalysts, one example is that the catalyst is a manganese complex.

In different mechanisms, reduction of the electron acceptor is accomplished by a photoexcited dye as the sensitizer, or the photoexcited dye is reduced through electron transfer from a semiconductor of the photocathode to a photoexcited state of the photoexcited dye and where the acceptor is reduced by a photoreduced dye molecule, or alternatively by a combination of these two mechanisms.

In a particular example, the photocathode is at least partially formed of NiO. In another example, the photocathode is at least partially formed of WO$_3$ and/or Fe$_2$O$_3$. Furthermore, the photocathode can be provided with a type of catalyst that promotes the reduction of the electron acceptor. A number of different catalysts are possible. For example, the photocathode catalyst is one that promotes the reduction of water to hydrogen. In an alternative embodiment, CO$_2$ could be used as the electron acceptor.

Figure 3:
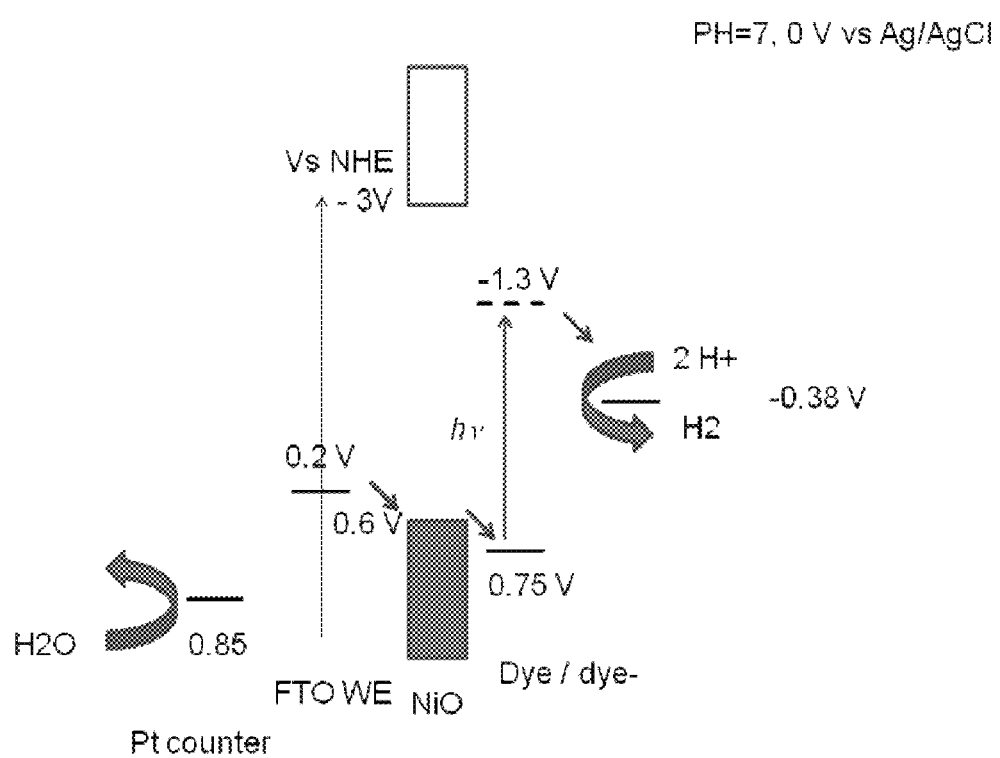
FIG. 3 is a schematic diagram illustrating some example principles and energy levels according to a particular embodiment.

FIG. 3 is a schematic diagram illustrating some example principles and energy levels according to a particular embodiment using a NiO cathode including a p-type sensitizer dye, a Pt counter electrode and water electrolyte at pH 7.

Figure 4:
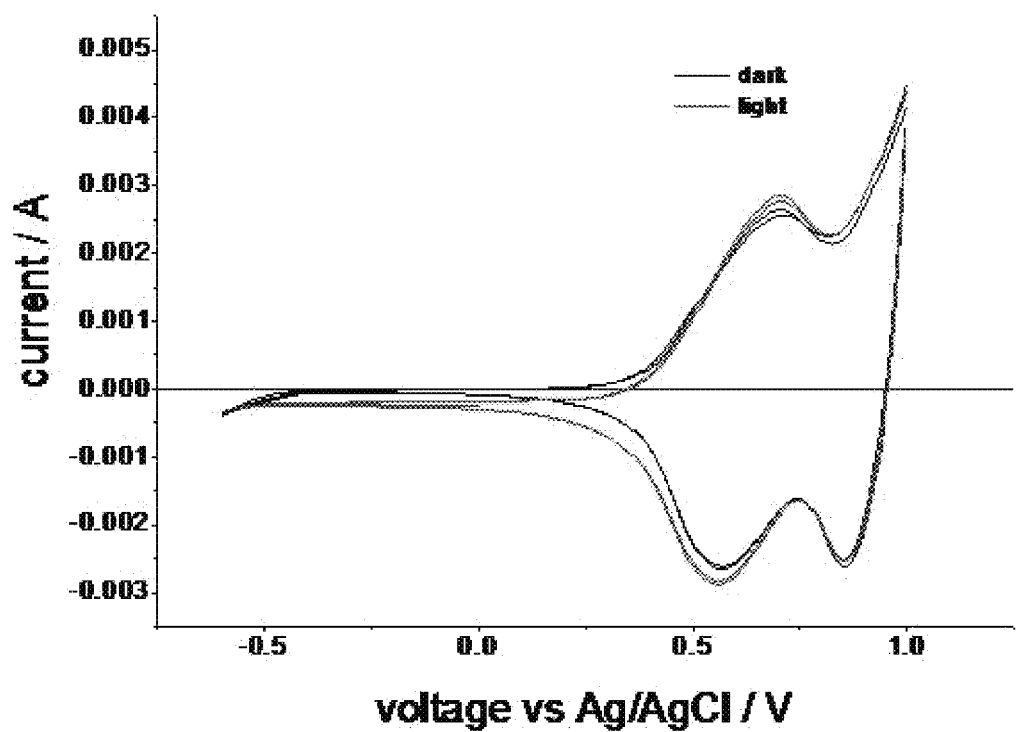
FIG. 4 is a cyclic voltammogram of an example p-type sensitized photocathode.

FIG. 4 depicts a cyclic voltammogram of the above described example photocathode in the presence (light) and absence (dark) of illumination with light.

Figure 5:
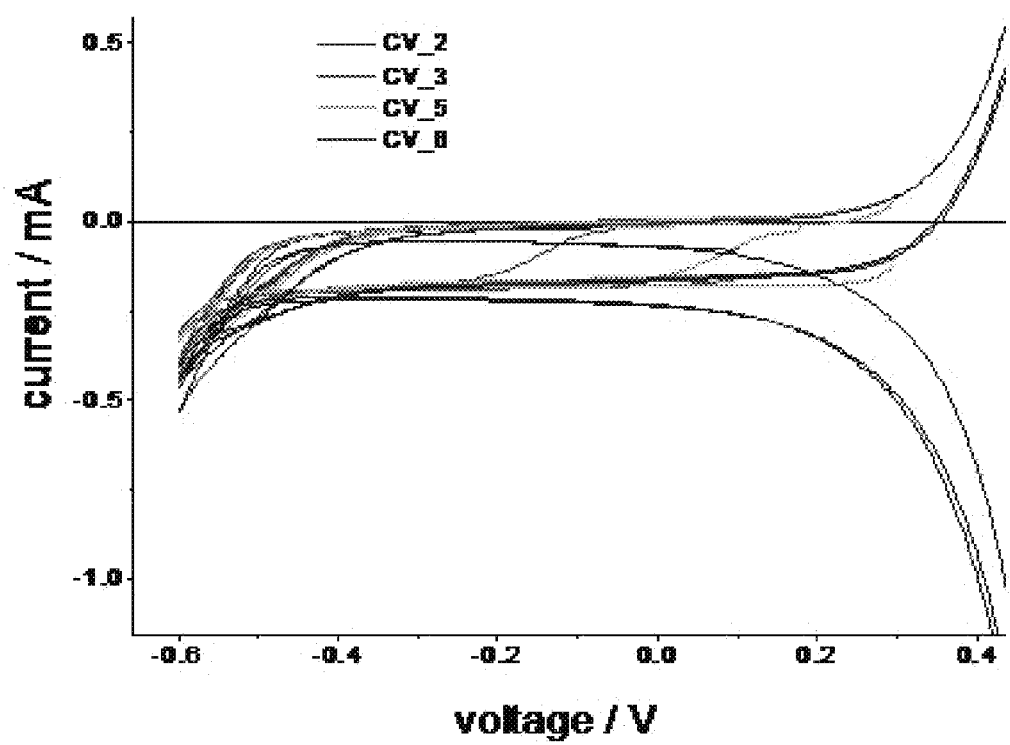
FIG. 5 is an expansion of the cyclic voltammogram shown in FIG. 3, in the region of where hydrogen gas is produced.

FIG. 5 enlarges the portion of FIG. 4 in the region where hydrogen gas is produced. As can be seen, a clear and definite photocurrent is observed.

Figure 6:
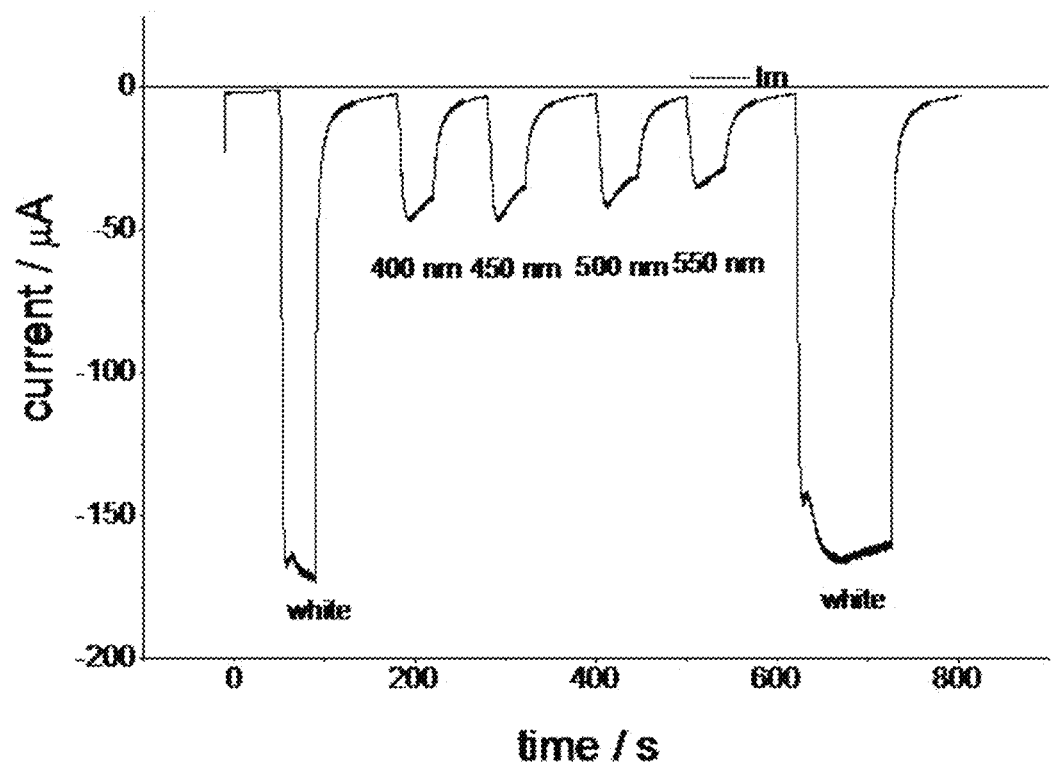
FIG. 6 shows the photocurrent of an example p-type sensitized photocathode due to hydrogen generation under different wavelengths of light illumination.

FIG. 6 shows the photocurrent using illuminating light of different wavelengths. As can be seen, the photoelectrochemical cell (or system) 20 displays a significant photocurrent deep into the visible spectrum, even upon illumination at a wavelength of 550 nm.

Figure 7:
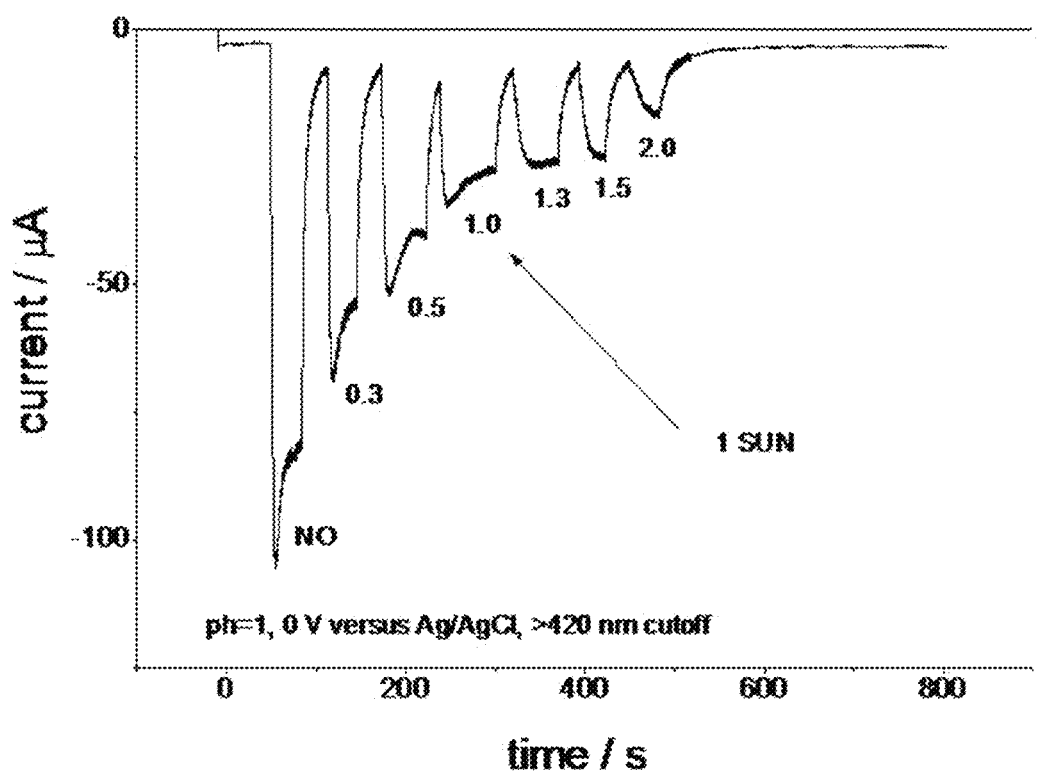
FIG. 7 shows the photocurrent of an example p-type sensitized photocathode due to hydrogen generation under different intensities of light illumination.

FIG. 7 depicts the photocurrent under different illumination intensities. The data for 1 sun is marked as such on the figure. The numbers shown relate to the extent of transmission through filters applied between the illuminating light and the cell 20. For example, the number 2 signifies the presence of roughly 2 filters in the illumination path, whereas the number 0.3 signifies the presence of a single, highly transmissive filter.

Figure 8:
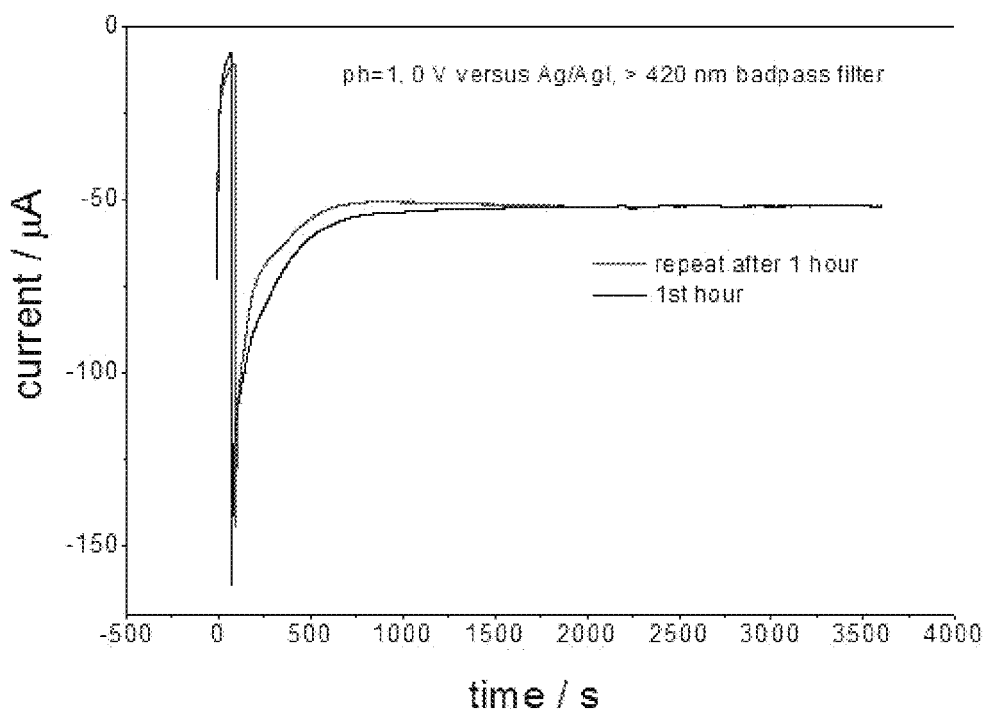
FIG. 8(a) shows the photocurrent of an example p-type sensitized photocathode due to hydrogen generation over an extended period of time, as can be seen, the photocurrent is sustained and invariant.
FIG. 8(b) shows the formation of bubbles of oxygen gas on the platinum counter-electrode used in an example photoelectrochemical cell in conjunction with an example p-type sensitized photocathode after illumination over an extended period of time.
Figure 8:
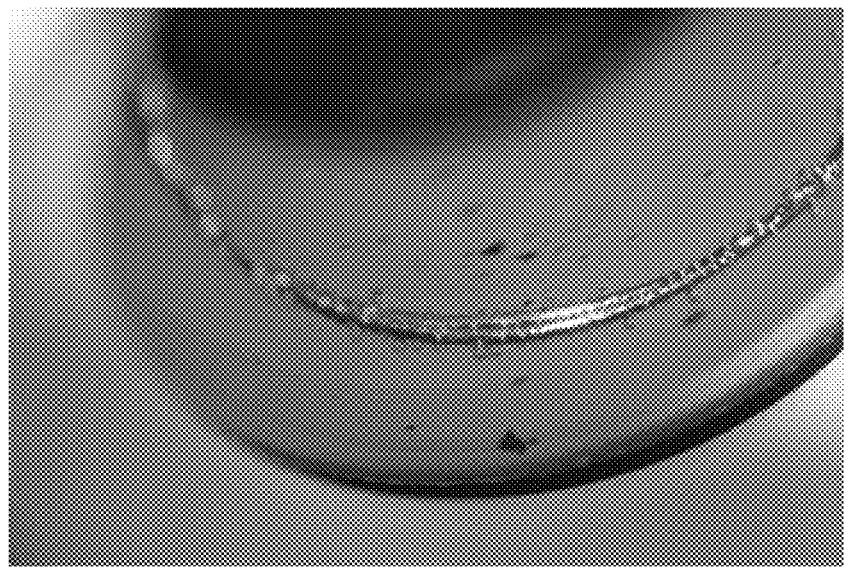

FIG. 8(*a*) shows the photocurrent due to hydrogen generation over an extended period of time. As can be seen, while there is a large initial current upon commencement of the illumination, the photocurrent flattens out and becomes invariant over time. The photocurrent remains stable for a long period of time. No n-type sensitized photoanode is known to display so stable and sustained a photocurrent.

FIG. 8(*b*) is a photograph showing the formation of bubbles of oxygen at the Pt anode of the cell 20.

Figure 9:
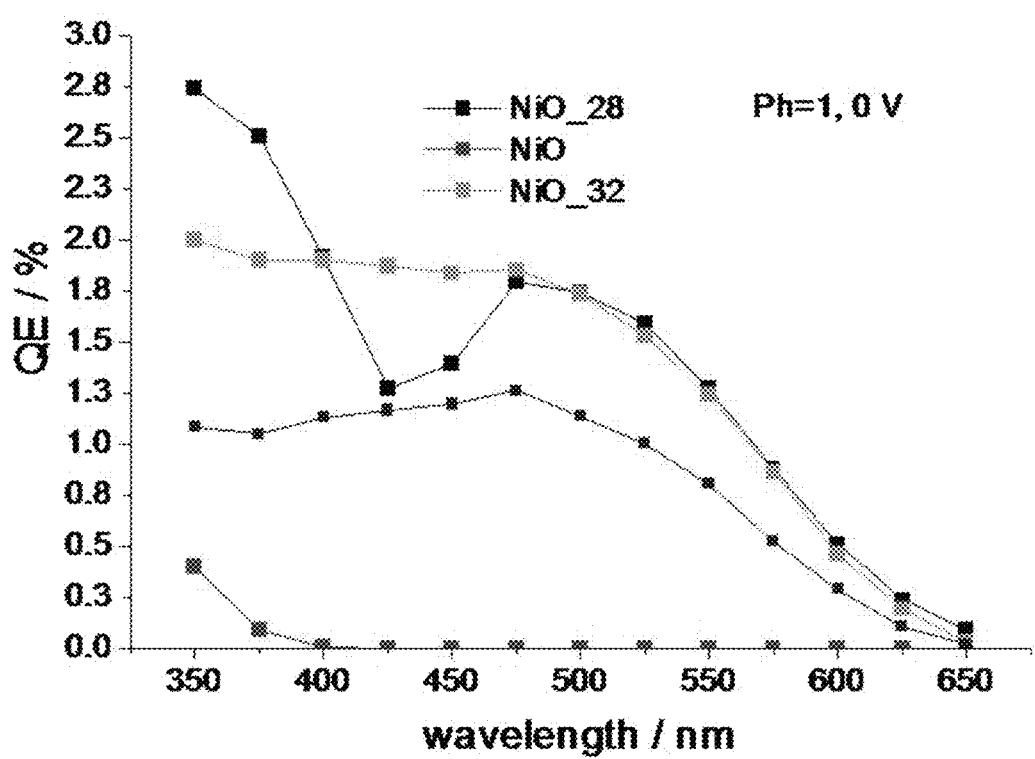
FIG. 9 illustrates the quantum efficiency of an example p-type sensitized photocathode in water-splitting as a function of the wavelength of the illuminating light.

FIG. 9 graphs the quantum efficiency of the cell 20 as a function of the wavelength of the illuminating light for three different semiconductor-dye combinations, NiO alone, NiO with dye "28", and NiO with dye "32". The dyes "28" and "32" are proprietary dyes.

Example 2

A Water-Splitting Tandem Cell Incorporating a Proton Reducing Photocathode and a Water-Oxidising Photoanode In Example 1, a "half-cell" operation is discussed in which hydrogen is generated from water, without necessarily requiring an applied electrical bias on the working electrodes. Complete solar driven water-splitting requires an equally efficient anode where water oxidation takes place driven either by the photovoltage generated by the photocathode or by using a photoanode in a tandem, Z-type arrangement, where both electrodes are photo-driven. For most cathodes of interest, an efficient photoanode can be used to generate the photovoltage needed to oxidise water. As noted above, this can be achieved by using p-type oxides other than NiO with higher valance band potential, or band-gap engineering of NiO to increase its oxidation potential.

Figure 10:
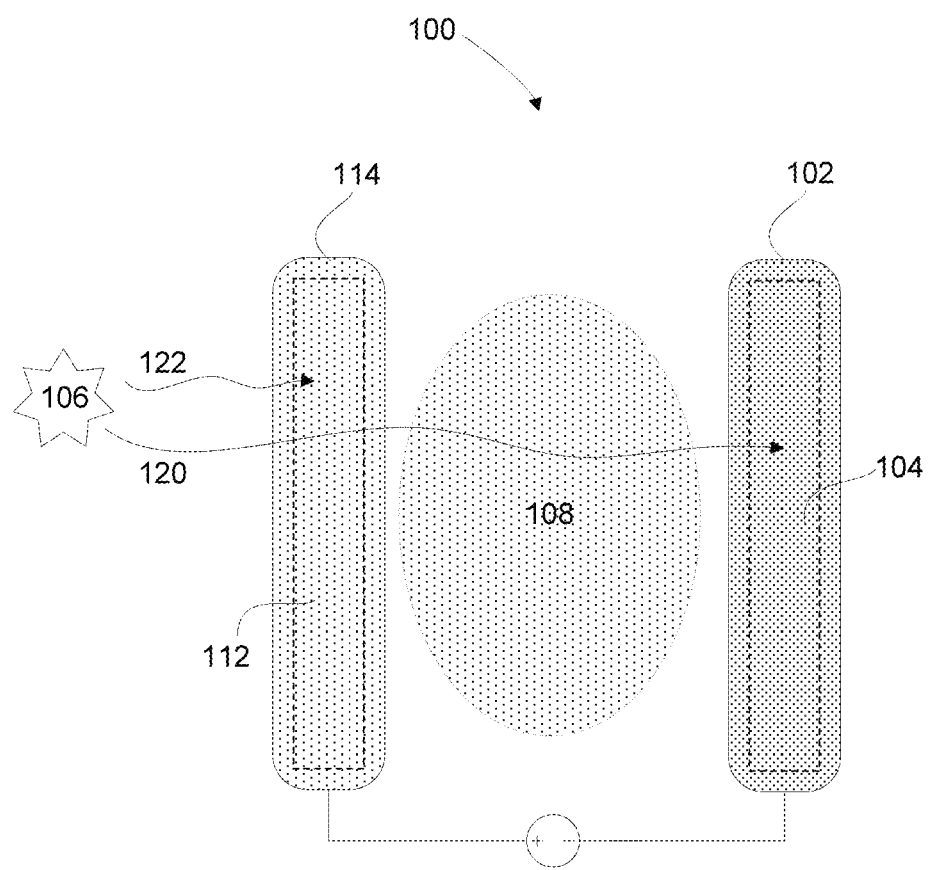
FIG. 10 shows a schematic of an example water-splitting tandem photoelectrochemical cell including a proton reducing photocathode and a water-oxidising photoanode.

Referring to FIG. 10, an alternative is to use another type of example water-splitting photoelectrochemical cell 100. Tandem cell 100 includes a cathode material 104 provided with a p-type sensitizer dye 102 as discussed previously, and a water-based electrolyte 108. Additionally, cell 100 employs an anode material 112 and an attached n-type sensitizer dye 114 to provide a photoactive semiconductor as the anode, for example using TiO$_2$, WO$_3$ or Fe$_2$O$_3$. The photoanode 112, 114 drives water oxidation at low overpotentials, making the overall cell 100 free-standing and not in need of an externally applied potential. In other words, by combining a p-type photocathode 104, 102 of the present invention with a photoanode 112, 114, such as those mentioned above, the cell 100 becomes a solar-driven water-splitting device.

Photoanodes of the above types may be sensitized by the addition of suitable n-type sensitizing dyes, such as the Ru dye depicted in FIG. 1. The sensitizer present at the photoanode may be an organic dye or a metal complex, such as but not limited to a ruthenium polypyridyl complex.

The light absorption of the photoanode and photocathode in tandem cells of these types can be tailored to be complementary. For example, the photoanode 112, 114 may be designed to absorb ultra-violet and high energy visible light 122, whereas the photocathode 104, 102 may be designed to absorb low energy visible light and infra-red light 120. In this way, a larger proportion of the solar spectrum of sunlight 106 may be harvested than is otherwise possible. In another example, a photoelectrochemical cell can have the two electrodes separated by a membrane in which proton diffusion is significantly faster than the diffusion of hydrogen and or oxygen.

Thus, in an example embodiment the second electrode (i.e. anode) is photoactive. The second electrode can thus be an n-type sensitized photoanode. The photoanode can include an n-type sensitizer which could be, for example, a dye, an organic dye, a metal complex, a semiconductor nanoparticle and/or a quantum dot.

The photoanode in such a tandem cell can be at least partially formed of one or more of: $TiO_2$, $ZnO$, $Fe_2O_3$, $WO_3$, $CdS$, $CdSe$, $Nb_2O_3$, $SnO_2$, and combinations thereof. The n-type sensitizer dye(s) which can be attached to, affixed or provided as part of the photoanode semiconductor can be one or more of the following: Ru(bipy) (bipy=2,2'-bipyridine), perylene, naphthalene, anthracene, porphyryns, indolines, coumarins, donor-acceptor type organic dyes, and combinations thereof.

In a specific example, the sensitizer provided at the p-type sensitized photocathode is capable of absorbing photons in the near-infrared and/or infrared ranges. Additionally, it could be provided that the sensitizer provided at the n-type sensitized photoanode is capable of absorbing photons in the near-infrared and/or infrared ranges.

In another form, the sensitizer provided at the p-type sensitized photocathode could be capable of absorbing photons of a first frequency range, and the sensitizer provided at the n-type sensitized photoanode could be capable of absorbing photons of a second frequency range that is different to the first frequency range. This allows the photocathode and the photoanode to compliment each other and for the cell in general to absorb or utilise a wider range of photon frequencies than for a single electrode.

In another example, the photocathode and the second electrode, or photoanode, can be separated by a membrane. For example, the membrane could allow proton diffusion to be faster than diffusion of hydrogen and oxygen to promote efficient operation of the cell.

Replacing non-photoactive cathodes, such as platinum, with p-type dye-sensitised photocathodes, results in lower cost, higher efficiency and increased overall spectral response of the water-splitting cell.

Example 3

Other Applications

While the main application of various embodiments is arguably in photoelectrochemical water-splitting devices, embodiments of the invention also may be applied in chemical transformations of other feedstocks. For example, carbon dioxide is reduced at potentials not dissimilar to that of hydrogen. Thus, an adaption of the discussed embodiments can be used to transform carbon dioxide under light-driven or light-assisted conditions.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

It will be appreciated that the embodiments described above are intended only to serve as examples, and that many other embodiments are possible within the spirit and the scope of the present invention.

The invention claimed is:

1. A photoelectrochemical cell, comprising:
   an electrolyte, wherein the electrolyte is water or is water-based; and
   a single junction p-type sensitized photocathode including a sensitizer, and an anode that is not photoactive;
   wherein the photoelectrochemical cell operates when the photoelectrochemical cell comprises the second electrode that is not photoactive, and wherein the single p-type sensitized photocathode is configured to form hydrogen from the water when illuminated with light and thereby causing solar-driven water-splitting.

2. The photoelectrochemical cell of claim 1, wherein the sensitizer is a dye, an organic dye or a donor-acceptor dye.

3. The photoelectrochemical cell of claim 1, wherein the sensitizer is a metal complex.

4. The photoelectrochemical cell of claim 1, wherein the sensitizer is a semiconductor nanoparticle or a quantum dot.

5. The photoelectrochemical cell of claim 1, wherein the photocathode is at least partially formed of NiO.

6. The photoelectrochemical cell of claim 1, wherein the photocathode is at least partially formed of $WO_3$ and/or $Fe_2O_3$.

7. The photoelectrochemical cell of claim 1, wherein in use a redox reaction proceeding at the anode is oxidation of water to oxygen.

8. The photoelectrochemical cell of claim 1, wherein the anode is provided with a catalyst to promote oxidation of water.

9. The photoelectrochemical cell of claim 8, wherein the catalyst is a manganese complex.

10. The photoelectrochemical cell of claim 1, wherein the sensitizer provided at the single junction p-type sensitized photocathode is capable of absorbing photons in the near-infrared and/or infrared ranges.

11. The photoelectrochemical cell of claim 1, wherein the sensitizer provided at the single junction p-type sensitized photocathode is capable of absorbing photons of a first frequency range.

12. A photoelectrochemical cell, comprising a single junction sensitized photocathode and an electrolyte that contains an electron acceptor, wherein the electrolyte is water or is water-based, and an anode second electrode that is not photoactive, wherein the photoelectrochemical cell is configured to reduce the electron acceptor and generate a fuel when illuminated with light and thereby causing solar-driven water-splitting.

13. The photoelectrochemical cell of claim 12, wherein the single junction sensitized photocathode includes a p-type sensitizer and the fuel is hydrogen.

14. A method of forming hydrogen comprising
providing the photoelectrochemical cell of claim 1;
illuminating the p-type sensitized photocathode with light; and
forming hydrogen from water at the p-type sensitized photocathode without applying an external voltage.

15. The method of claim 14, wherein the electrolyte includes an electron acceptor, and wherein light illumination of the p-type sensitized photocathode results in reduction of the electron acceptor.

16. The method of claim 15, wherein:
(i) reduction of the electron acceptor is accomplished by a photoexcited dye as the sensitizer; or
(ii) the photoexcited dye is reduced through electron transfer from a semiconductor of the photocathode to a photoexcited state of the photoexcited dye and where the acceptor is reduced by a photoreduced dye molecule; or
(iii) a combination of mechanisms (i) and (ii).

* * * * *